(12) United States Patent
Momeyer et al.

(10) Patent No.: US 8,952,987 B2
(45) Date of Patent: Feb. 10, 2015

(54) USER INTERFACE ELEMENTS AUGMENTED WITH FORCE DETECTION

(75) Inventors: Brian Momeyer, Carlsbad, CA (US); Kevin M. Beckwith, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 13/416,731

(22) Filed: Mar. 9, 2012

(65) Prior Publication Data

US 2012/0293551 A1    Nov. 22, 2012

Related U.S. Application Data

(60) Provisional application No. 61/488,072, filed on May 19, 2011.

(51) Int. Cl.
*G06F 3/044*    (2006.01)
*G06F 3/0488*    (2013.01)

(52) U.S. Cl.
CPC .................................. *G06F 3/0488* (2013.01)
USPC ....................................................... 345/633

(58) Field of Classification Search
CPC ............................... G06F 3/0414; G06F 3/016
See application file for complete search history.

(56) References Cited

U.S. PATENT DOCUMENTS

| | | | |
|---|---|---|---|
| 6,448,959 B1 | 9/2002 | Kawaguchi et al. | |
| 7,683,889 B2 | 3/2010 | Rimas Ribikauskas et al. | |
| 2008/0024459 A1 | 1/2008 | Poupyrev et al. | |
| 2009/0140985 A1 | 6/2009 | Liu | |
| 2010/0039393 A1 | 2/2010 | Pratt et al. | |
| 2010/0149129 A1 | 6/2010 | Homma et al. | |
| 2011/0018695 A1 | 1/2011 | Bells et al. | |
| 2011/0037609 A1 | 2/2011 | Kim et al. | |
| 2011/0050588 A1 | 3/2011 | Li et al. | |
| 2011/0050653 A1 | 3/2011 | Miyazawa et al. | |
| 2011/0107212 A1 | 5/2011 | Jeong | |

FOREIGN PATENT DOCUMENTS

| | | |
|---|---|---|
| JP | 2008033739 A | 2/2008 |
| JP | 2011034216 A | 2/2011 |
| KR | 2011004203 A | 1/2011 |
| KR | 20110049431 A | 5/2011 |
| WO | 2010073731 A1 | 7/2010 |

OTHER PUBLICATIONS

International Search Report and Written Opinion—PCT/US2012/035992—ISA/EPO—Apr. 10, 2012.
Partial International Search Report—PCT/US2012/035992—ISA/EPO—Jul. 17, 2012.

*Primary Examiner* — Van Chow
(74) *Attorney, Agent, or Firm* — Silicon Valley Patent Group LLP

(57) ABSTRACT

A computing device includes a touch screen display with at least one force sensor, each of which provides a signal in response to contact with the touch screen display. Using force signals from the at least one force sensor that result from contact with the touch screen, the operation of the computing device may be controlled, e.g. to select one of a plurality of overlaying interface elements, to prevent the unintended activation of suspect commands that require secondary confirmation, and to mimic the force requirements of real-world objects in augmented reality applications.

14 Claims, 7 Drawing Sheets

USER INTERFACE ELEMENTS AUGMENTED WITH FORCE DETECTION

CROSS-REFERENCE TO RELATED APPLICATION(S)

This application claims priority under 35 USC 119 to provisional application No. 61/488,072, filed May 19, 2011, which is assigned to the assignee hereof and which is incorporated herein by reference.

BACKGROUND

1. Background Field

Embodiments of the subject matter described herein are related generally to a user interface for a computing system, and more particularly to force detection in a user interface for a computing system.

2. Relevant Background

Touch screen displays have become ubiquitous in current mobile platform applications, such as smart phones. Touch screen displays eliminate the need for key pads. In one adaptation, touch screen displays are used, not only as a replacement of key pads, but as a user interface that detects user gestures on the touch screen and translates the gestures into desired commands to be performed.

Touch screen displays are, conventionally, an LCD (liquid crystal display) technology, or an LPD (light emitting polymer display) technology. The screens are overlaid with a touch sensor, which use touch sensing technology such as capacitive, resistive, infrared, and surface acoustic wave technologies, to determine one or more points of contact with the touch screen. The touch sensing technologies, however, receive information in two-dimensions in the plane of the display. Some touch sensing technologies, such as capacitive sensors, may detect how close an object is to the touch screen display 12, but ultimately determines the object to be in contact when the detected parameter, e.g., capacitance, is within a specified threshold. Thus, such touch sensing technology is really detecting only two-dimensional information, i.e., whether the object is close enough to be considered contact and if so, the two-dimensional position of that contact. Thus, conventional capacitive touchscreens and user interfaces respond only to touch, not force.

Thus, conventional touch screen displays function as a two-dimensional user interface, thereby limiting the user's interfacing opportunities and the devices response thereto.

SUMMARY

A computing device includes a touch screen display with at least one force sensor, each of which provides a signal in response to contact with the touch screen display. Using force signals from the at least one force sensor that result from contact with the touch screen, the operation of the computing device may be controlled, e.g. to select one of a plurality of overlaying interface elements, to prevent the unintended activation of commands that require secondary confirmation, and to mimic the force requirements of real-world objects in augmented reality applications.

In one implementation, a method includes displaying a plurality of selectable objects that are at least partially overlapping on a touch screen display operatively coupled to a computing device; determining a force level of a contact with the touch screen display using at least one force sensor coupled to the touch screen display; using the force level of the contact to select an object from the plurality of selectable objects; and controlling the computing device based on the object selected.

In one implementation, an apparatus includes a housing; a touch screen display comprising a display and at least one force sensor coupled between the housing and the display; and a processor connected to receive data from the at least one force sensor, wherein the processor is configured to cause the touch screen display to display a plurality of selectable objects that are at least partially overlapping, determine a force level of a contact with the touch screen display based on the data from the at least one force sensor, use the force level of the contact to select an object from the plurality of selectable objects, and to initiate a command associated with the object selected.

In one implementation, an apparatus includes means for displaying a plurality of selectable objects that are at least partially overlapping on a touch screen display operatively coupled to a computing device; means for determining a force level of a contact with the touch screen display using at least one force sensor coupled to the touch screen display; means for using the force level of the contact to select an object from the plurality of selectable objects; and means for controlling the computing device based on the object selected.

In one implementation, a non-transitory computer-readable medium including program code stored thereon includes program code to display a plurality of selectable objects that are at least partially overlapping on a touch screen display operatively coupled to a computing device; program code to determine a force level of a contact with the touch screen display using at least one force sensor coupled to the touch screen display; program code to use the force level of the contact to select an object from the plurality of selectable objects; and program code to control the computing device based on the object selected.

In one implementation, a method includes detecting a contact with a selectable object on a touch screen display, the selectable object is associated with a command to control a computing device; determining that the command to control the computing device requires secondary confirmation; determining a force level of the contact with the touch screen display using at least one force sensor coupled to the touch screen display; and initiating the command in response to the contact with the selectable object and the force level.

In one implementation, an apparatus includes a housing; a touch screen display comprising a display, a touch sensor coupled to the display, and at least one force sensor coupled between the housing and the display; and a processor connected to receive data from the touch sensor and the at least one force sensor, wherein the processor is configured to detect a contact with a selectable object on the touch screen display based on the data from the touch sensor, the selectable object is associated with a command, determine that the command requires secondary confirmation, determine a force level of the contact with the touch screen display based on data from the at least one force sensor, and initiate the command in response to the contact with the selectable object and the force level.

In one implementation, an apparatus includes means for detecting a contact with a selectable object on a touch screen display, the selectable object is associated with a command to control a computing device; means for determining that the command to control the computing device requires secondary confirmation; means for determining a force level of the contact with the touch screen display using at least one force sensor coupled to the touch screen display; and means for initiating the command in response to the contact with the selectable object and the force level.

In one implementation, a non-transitory computer-readable medium including program code stored thereon includes program code to detect a contact with a selectable object on a touch screen display, the selectable object is associated with a command to control a computing device; program code to determine that the command to control the computing device requires secondary confirmation; program code to determine a force level of the contact with the touch screen display using at least one force sensor coupled to the touch screen display; and program code to initiate the command in response to the contact with the selectable object and the force level.

In one implementation, a method includes displaying an augmented reality representation of a real-world device on a touch screen display operatively coupled to a computing device, wherein the augmented reality representation comprises a selectable object that is associated with a real-world selectable object on the real-world device, the real-world selectable object having a force requirement to select; detecting a contact with the selectable object on the touch screen display; determining a force level of the contact with the touch screen display using at least one force sensor coupled to the touch screen display; comparing the force level to a force threshold that is associated with the force requirement; and controlling the computing device in response to the contact when the force level is greater than the force threshold.

In one implementation, an apparatus includes a housing; a camera to capture images of a real-world device with a real-world selectable object that has a force requirement to select; a touch screen display comprising a display, a touch sensor coupled to the display, and at least one force sensor coupled between the housing and the display; and a processor connected to receive the images from the camera and data from the touch sensor and the at least one force sensor, wherein the processor is configured to cause the display to display an augmented reality representation of the real-world device on the display, wherein the augmented reality representation comprises a selectable object that is associated with a real-world selectable object, detect a contact with the selectable object on the touch screen display based on the data from the touch sensor, determine a force level of the contact with the touch screen display based on data from the at least one force sensor, compare the force level to a force threshold that is associated with the force requirement, and to initiate a command associated with the selectable object in response to the contact when the force level is greater than the force threshold.

In one implementation, an apparatus includes means for displaying an augmented reality representation of a real-world device on a touch screen display operatively coupled to a computing device, wherein the augmented reality representation comprises a selectable object that is associated with a real-world selectable object on the real-world device, the real-world selectable object having a force requirement to select; means for detecting a contact with the selectable object on the touch screen display; means for determining a force level of the contact with the touch screen display using at least one force sensor coupled to the touch screen display; means for comparing the force level to a force threshold that is associated with the force requirement; and means for controlling the computing device in response to the contact when the force level is greater than the force threshold.

In one implementation, a non-transitory computer-readable medium including program code stored thereon, includes program code to display an augmented reality representation of a real-world device on a touch screen display operatively coupled to a computing device, wherein the augmented reality representation comprises a selectable object that is associated with a real-world selectable object on the real-world device, the real-world selectable object having a force requirement to select; program code to detect a contact with the selectable object on the touch screen display; program code to determine a force level of the contact with the touch screen display using at least one force sensor coupled to the touch screen display; program code to compare the force level to a force threshold that is associated with the force requirement; and program code to control the computing device in response to the contact when the force level is greater than the force threshold.

DETAILED DESCRIPTION

Figure 1:
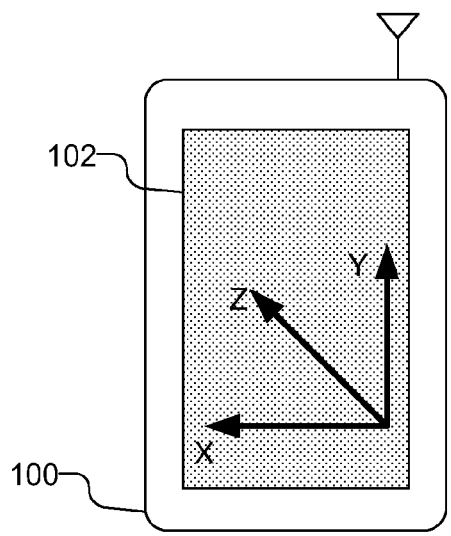
FIG. 1 illustrates a computing device with a touch screen display that detects three-dimensional touch information.

FIG. 1 illustrates a computing device 100 with a touch screen display 102 that detects touch information in three-dimensions, i.e., along the X-axis, the Y-axis, and the Z-axis. With the addition of Z-axis information, the touch screen display 102 permits three-dimensional interfacing and is not limited to simple two-dimensional interface on the surface of the touch screen.

The computing device 100 may be a mobile platform, such as a cellular or other wireless communication device, personal communication system (PCS) device, personal navigation device (PND), Personal Information Manager (PIM), Personal Digital Assistant (PDA), laptop or other suitable mobile device or any other suitable stationary computing device, including a desk top computer or other similar device. "Computing device" is, thus, intended to include all devices, including wireless communication devices, computers, laptops, etc. with a user interface that includes a touch screen display.

Figure 2:
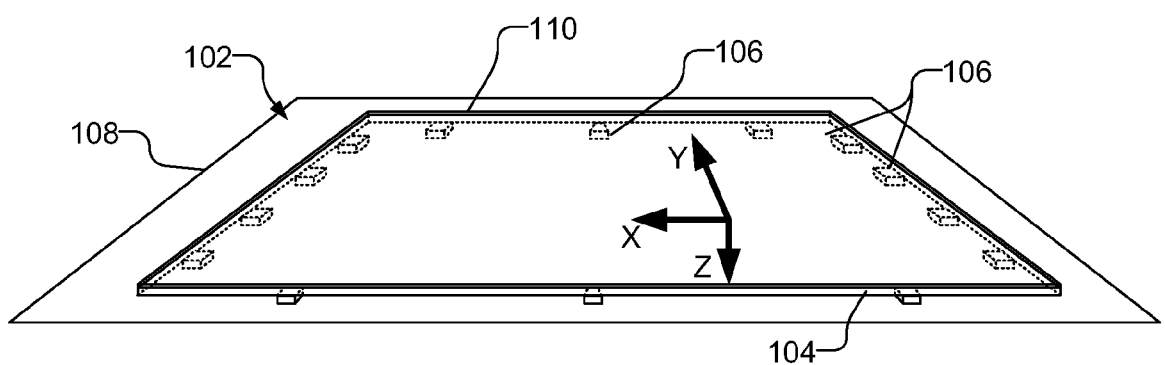
FIG. 2 illustrates a perspective view of the touch screen display with force sensors to detect three-dimensional touch information.

FIG. 2 illustrates a perspective view of the touch screen display 102 of the computer device 100 with the X, Y, and Z axes. Touch screen display 102 includes a display element 104, such as an LCD display, LPD display or other appropriate display, and includes at least one force sensor 106, and in some embodiments, a plurality of force sensors 106 located, e.g., around the perimeter of the display element 104 between the display element 104 and a frame for the housing 108 in the case of the computing device 100. The force sensors 106 may be adhesively attached to the housing 108 and the display element 104. Thus, the display element 104 is connected to the housing 108 through the force sensors 106. As illustrated in FIG. 2, four force sensors 106 are located on the left and right sides of the display element 104 and three force sensors 106 are located along the top and the bottom sides of the display element 104. More or fewer force sensors 106 and different arrangements than illustrated in FIG. 2 may be used if desired. For example, four force sensors 106 may be used, one in each corner of the display element 104. If desired, force sensors 106 may be located in the center of the display element 104, as opposed to or in addition to being arranged around the perimeter. The force sensors 106 may be capacitive force sensors, such as that produced by PPS Touch Technology Inc., Stantum Inc., Peratech Ltd., or Artificial Muscle, Inc. Other force sensors, such as resistive force sensors, such as that produced by Interlink Inc., may be used if desired. In addition, piezoelectric force sensors, such as polymer types produced by Measurement Specialties Inc. or ceramic types produced by Murata Inc, or any other appropriate type of force sensor.

A force sensor 106 detects the force or amount of force applied to the sensor. With a plurality of force sensors 106 arranged between the display element 104 and the housing 108, the force sensors 106 can be used together to determine the force applied to the display element 104 in the Z-axis, as well as the centroid of the force along the X and Y axes. For example, a touch applied to the top left corner of the display element 104 will produce a greater force reading by the force sensors 106 near the top left corner than the force sensors 106 near the bottom right corner.

Calibration may be performed to compensate for possible deformation of the glass or plastic in the display element 104 when force is applied. Calibration may be performed by applying known forces to specific areas of the display element 104 and adjusting the resulting force reading along the Z axis as well as the centroid of force along the X and Y axes to correspond with the known forces and the specific areas that the forces are applied. The touch screen display 102 may further include a conventional touch sensor 110 over the display element 104, which may be capacitive, resistive, infrared, and surface acoustic wave technologies. The touch sensor 110 may be used in the calibration of the force sensors 106 by ensuring that the centroid of force determined by the force sensors 106 is closely aligned, e.g., centered, with the touch location identified by the touch sensor 110.

Figure 3:
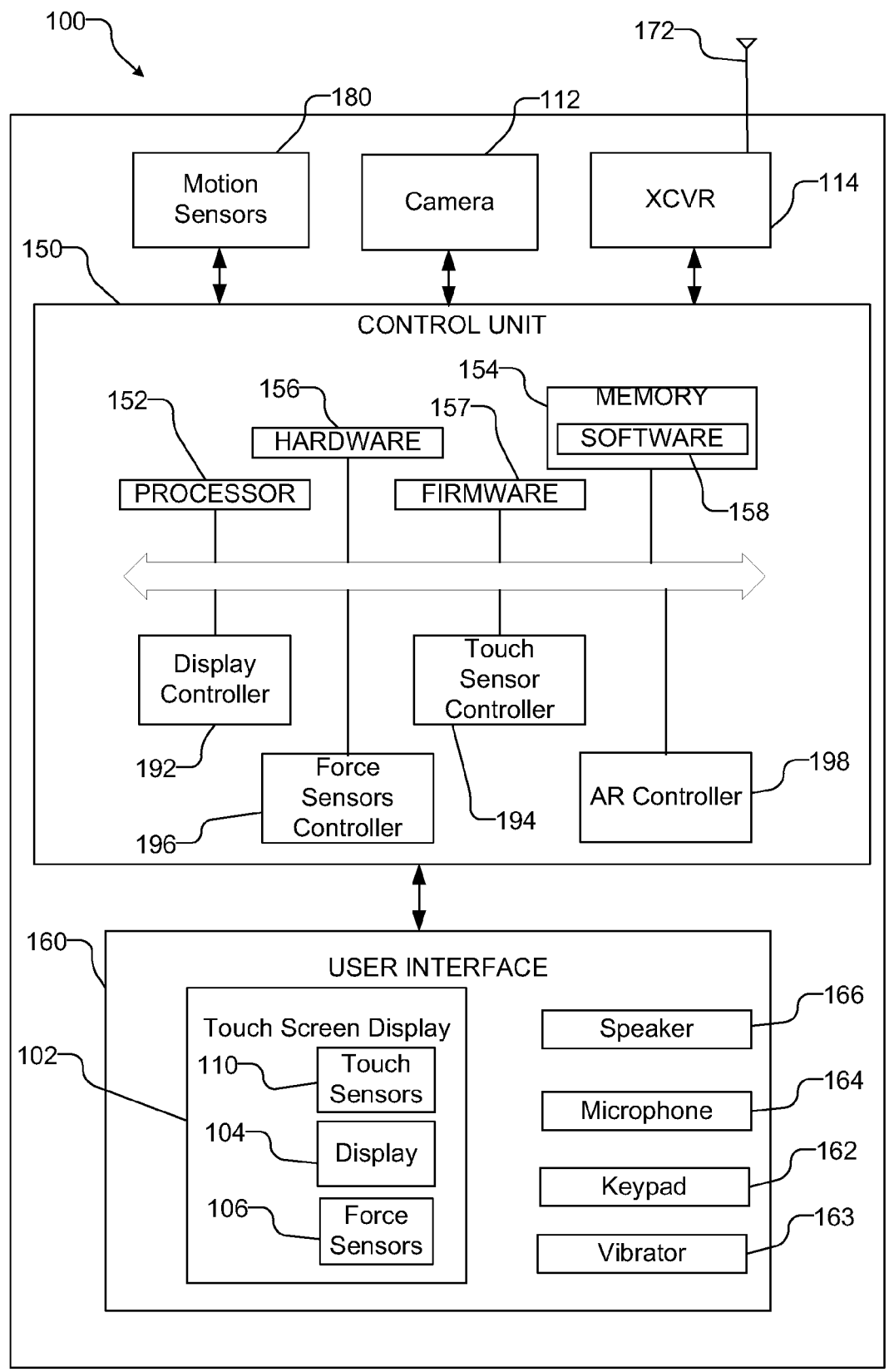
FIG. 3 is a block diagram of a computing device with a touch screen display with force sensors and capable of supporting commands prompted by three-dimensional user interfacing.

FIG. 3 is a block diagram of a touch screen display 102 with at least one force sensor 106 operatively coupled to the computing device 100 and capable of supporting commands prompted by three-dimensional user interfacing. The computing device 100 is a system that includes means for receiving force measurements from a plurality of locations of a touch screen display in response to contact with the touch screen display, which may include, e.g., the force sensors 106 as well as a control unit 150 that may include a processor 152 and associated memory 154, hardware 156, software 158, and firmware 157.

Computing device 100 includes a user interface 160 that is in communication with the control unit 150, e.g., the control unit 150 accepts data and controls the user interface 160. It should be understood that with some computing devices, such as a desk top computer, the touch screen display 102 may is physically separated from the control unit 150 and is connected to the control unit 150 via cables or wirelessly. The user interface 160 includes the touch screen display 102, which includes the display element 104. The touch screen display 102 further includes the force sensors 106 and may include the touch sensors 110. The display element 104, force sensors 106, and touch sensors 110 are controlled by the control unit 150 by a display controller 192, force sensors controller 196, and touch sensor controller 194, respectively.

The user interface 160 may further include a keypad 162 or other input device through which the user can input information into the computing device 100. If desired, the keypad 162 may be obviated by integrating a virtual keypad into the touch screen display 102. The user interface 160 may also include, e.g., a microphone 164 and speaker 166, e.g., when the computing device 100 is a cellular telephone. The user interface 160 may also include a vibrator 163 for providing haptic feedback.

The computing device 100 may further include a camera 112 for capturing images, which may be used, e.g., in augmented reality type applications. The computing device 100 may further include a transceiver 114 (including a transmitter and receiver), e.g. a cellular modem or a wireless network radio receiver/transmitter that is capable of sending and receiving communications to and from a cellular tower, wireless access points or other wireless devices, via antenna 172. The computing device 100 may further include motion sensors 180, such as three-axis accelerometers or gyroscopes. The motion sensors 180 may be used as part of the user interface 160, e.g., to detect gestures in the form of movement of the computing device 100 or the orientation of the computing device 100 when gestures are detected by the touch screen display 102. The motion sensors 180 and/or camera 112 may also be used for position determination which may be used in augmented reality type applications.

The control unit 150 may be provided by a processor 152 and associated memory 154, hardware 156, software 158, and firmware 157. The control unit 150 includes a means for controlling the display element 104, means for controlling the touch sensors 110 and means for controlling the force sensors 106, illustrated as a display controller 192, touch sensor controller 194, and force sensor controller 196, respectively. The control unit 150 may also include an augmented reality (AR) controller 198 that performs augmented reality type applications. The display controller 192, touch sensor controller 194, force sensor controller 196, and AR controller 198 may be implanted in the processor 152, hardware 156, firmware 157, or software 158, i.e., computer readable media stored in memory 154 and executed by processor 152, or a combination thereof. The display controller 192, touch sensor controller 194, and force sensor controller 196, and AR controller 198 nevertheless are illustrated separately for clarity. For example, touch screen controllers manufactured by Cypress, Inc. may be used as the touch sensor controller 194, as well as the force sensor controller 196. Further, voltage dividers with an A/D convert or other impedance measurement circuits may be used with the resistive force sensors controller 196.

It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

The computing device 100 may include a means for displaying a plurality of selectable objects that are at least partially overlapping on the touch screen display 102, which may include the display controller 192 and display element 104. A means for determining a magnitude of the force (sometimes referred to as a level or force level) applied to the touch screen display 102 includes the force sensors 106 and force sensors controller 196. A means for using the force level of the contact to select an object from the plurality of selectable objects and means for controlling the computing device based on the object selected may include the processor 152, hardware 156, firmware 157, as well as associated software 158. The computing device may further include a means for detecting a contact with an object on a touch screen display, which may include the touch sensors and touch sensor controller 194. A means for determining that the command to control the computing device requires secondary confirmation and means for initiating the command may include the processor 152, hardware 156, firmware 157, as well as associated software 158. The computing device 100 may also include a means for displaying an augmented reality representation of a real-world device, which may include the AR controller 198, the camera 112, and motion sensors 180. A means for comparing the force level of a contact to a force threshold may include the processor 152, hardware 156, firmware 157, as well as associated software 158.

The software 158 may include program codes stored in a non-transitory computer-readable medium, such as memory 154 and executed by the processor 152 and may be used to run the processor and to control the operation of the computing device 100 as described herein. The program code stored in a computer-readable medium may additionally include program code to cause the processor to control any operation of the computing device 100 as described further below.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4:
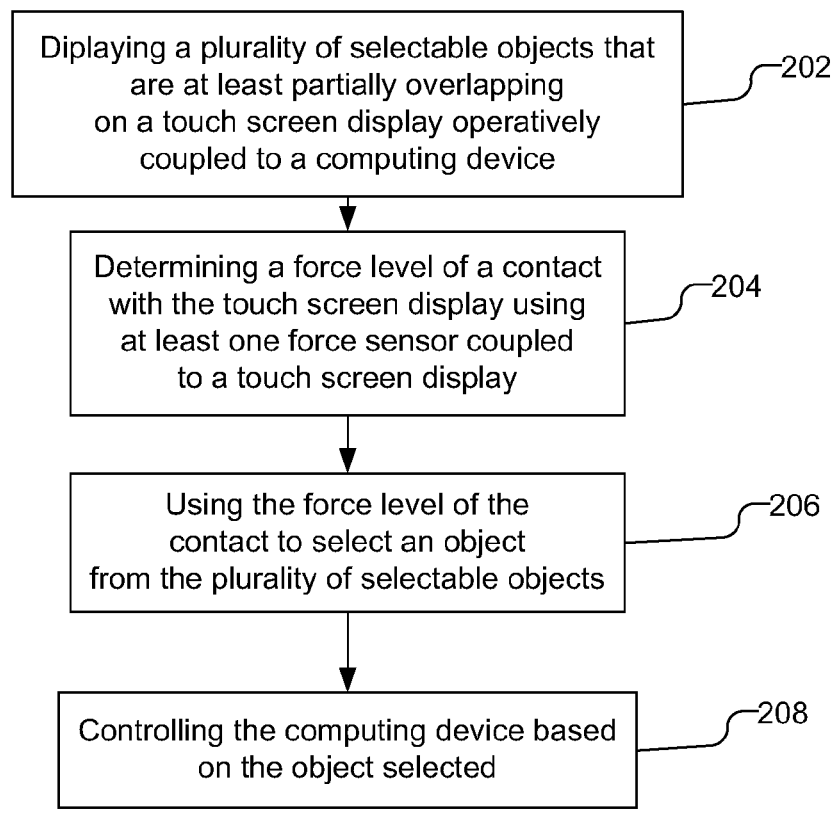
FIG. 4 is a flow chart illustrating one embodiment of using at least one force sensor on a touch screen display to control the operation of the computing device by using the detected force to select one of a plurality of overlaying interface elements.

FIG. 4 is a flow chart illustrating one embodiment of using at least one force sensor 106 on a touch screen display 102 to control the operation of the computing device 100 by using the detected force to select one of a plurality of overlaying interface elements. Use of force detection to select interface elements may be particularly useful, e.g., where the user is walking and does not have the advantage of using fine motor control to select objects. As illustrated in FIG. 4, a plurality of selectable objects that are at least partially overlapping are displayed on the touch screen display operatively coupled to the computing device 100 (202). The selectable objects may be semi-transparent so that underlying selectable objects are visible to a user so as to alert the user to options that may be selected. A force level of a contact with the touch screen display 102 is determined using at least one force sensor 106 coupled to a touch screen display 102 (204). If desired, the location of the contact on the touch screen display 102 may also be detected, e.g., based on the touch sensor 110 coupled to the touch screen display, and used to determine which of several groups of overlapping selectable objects is selected. The force level of the contact is used to select an object from the plurality of selectable objects (206). For example, a greater force may be required to select an underlying object than the force required to select an overlying object. The selection of the object based on the force level may be performed by comparing the force level to a force threshold associated with each of the selectable objects, e.g., where exceeding a force threshold associated with a selectable object results in an underlying object being selected. The computing device is then appropriately controlled based on object selected (208), e.g., by initiating a command associated with the object selected or by providing haptic feedback to indicate the object is selected. Haptic feedback may be provided, e.g., by causing the computing device 100 to vibrate, e.g., using vibrator 163. Haptic feedback may also be provided by synthetic elastomeric activators, such as those produced by Artificial Muscle, Inc. These may be mounted in a frame, rolled into a cylinder, or mounted in other configurations to provide proper haptic feedback. Additionally, haptic feedback may be provided by a direct electrical stimulus of human skin, such as that provided by Senseg, Inc.'s Tixel electrodes.

Figure 5:
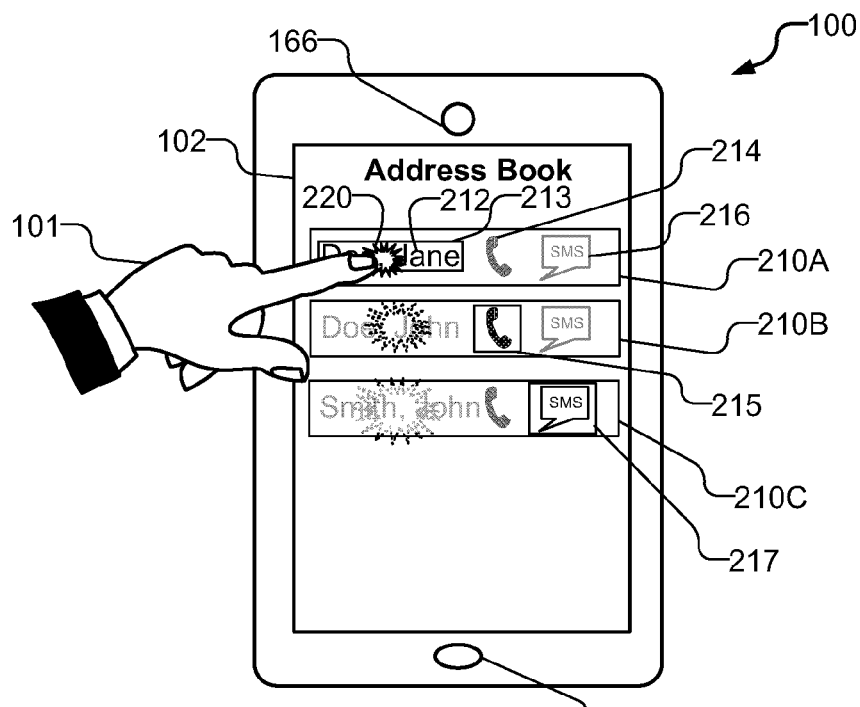
FIG. 5 illustrates a user contacting the touch screen display of computing device with a force to select one of a plurality of overlaying interface elements.

FIG. 5 illustrates a user 101 contacting the touch screen display 102 of computing device 100 with a force to select one of a plurality of overlaying interface elements. Computing device 100 is illustrated as a mobile phone or smart phone including a speaker 166 and microphone 164, but it should be understood that computing device 100 is not limited thereto. FIG. 5, by way of example, illustrates the touch screen display 102 displaying selectable entries 210A, 210B, and 210C in an address book, where each entry includes overlaying interface elements in the form of a name 212, a telephone icon 214 and a text message icon 216. The contact of the user 101 with the touch screen display 102 is illustrated in FIG. 5 as a starburst 220. Throughout this document the larger the size of the illustrated starburst, the greater the force that is being applied to the touch screen display 102. The contact by user 101 produces relatively little force, as detected by force sensors 106 (shown in FIG. 2), and thus the name 212 is determined to be selected, which may cause the computing device 100 to display, e.g., information about the desired entry. If desired, the touch screen display 102 may provide an indication of which of the overlying interface elements is selected based on the magnitude of the force, as illustrated by box 213. Additionally, if desired, acceptance of a selection of an interface element may be caused by the user 201 quickly removing the contact with the touch screen display 102. In other words, the termination of the contact with the touch screen display 102 is detected and used to accept the selection. Further, the user may retain contact with the touch screen display 102 but the detection of a change in the force level applied to the touch screen display 102 may be used to select another of the interface elements.

If the user 101 had applied greater force, as illustrated by starburst 222 on entry 210B, the telephone icon 214 for that entry would be selected. Selection of the telephone icon 214 may cause the touch screen display 102 to alter the display of the icon from semi-transparent to opaque, illustrated by the telephone icon 214 being darker than in other entries, or by generating a box 215 around the telephone icon 214 or any other desired manner. Selection of the telephone icon 214 may cause the computing device 100 to call the phone number associated with the entry.

Application of even greater force, illustrated by starburst 224, may result in selection of text messaging icon 216, which may be displayed by altering the display of the icon from semi-transparent to opaque, by generating a box 217 around the text icon 216 or in any other desired manner. Selection of the text icon 216 may cause the computing device 100 to initiate a text message to the number associated with the entry.

As can be seen in FIG. 5, the contact with the touch screen display 102, illustrated by starburst 220, 222, and 224, need not be directly on the specific element desired to be selected, rather the magnitude of the force of the contact is used to determine which interface element is selected. It should be noted, however, that the location of the contact on the touch screen display 102 may be used to determine which group of overlaying interface elements, e.g., which entry 210A, 210B, or 210C, is being selected.

Figure 6:
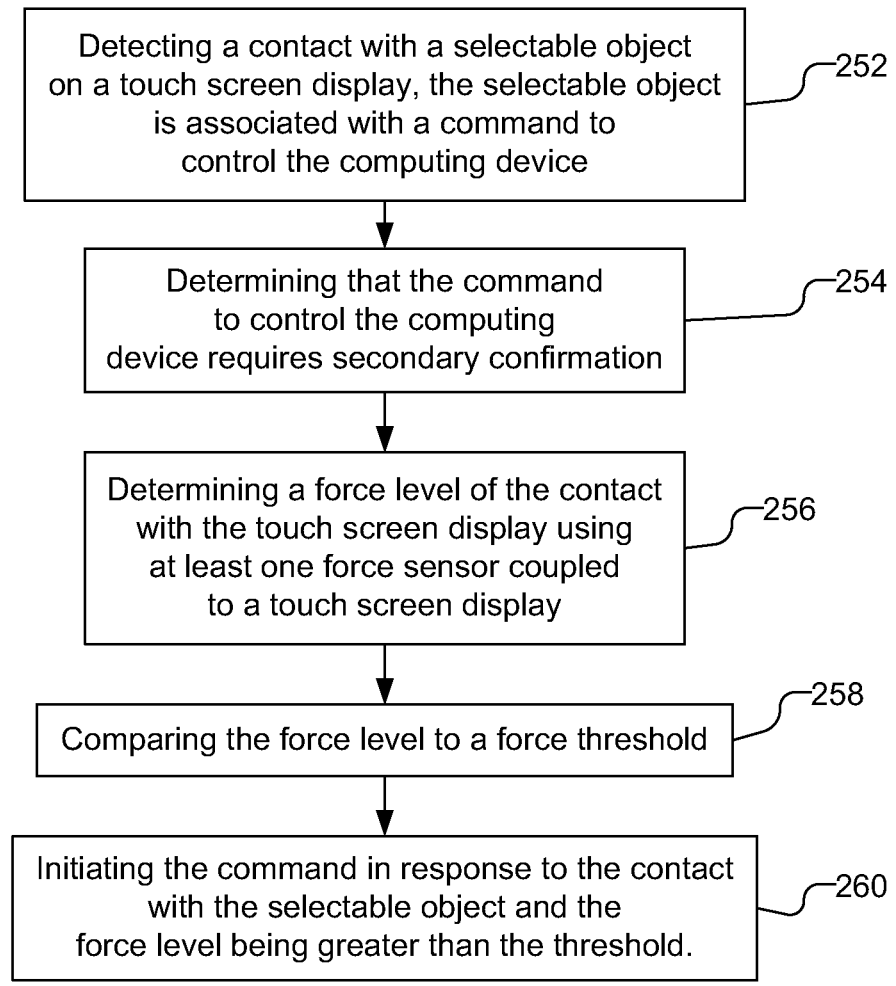
FIG. 6 is a flow chart illustrating one embodiment of using at least one force sensor on a touch screen display to control the operation of the computing device by preventing unintended activation of suspect commands that require secondary confirmation, e.g., commands that are associated with unusual, irreversible, non-default, or potentially system dangerous actions.

FIG. 6 is a flow chart illustrating one embodiment of using at least one force sensor 106 on a touch screen display 102 to control the operation of the computing device 100 by preventing unintended activation of suspect commands that require secondary confirmation, e.g., commands that are associated with unusual, irreversible, non-default, or potentially system dangerous actions. Currently, systems sometime use a secondary dialog box for secondary confirmation to make certain that a user wants to perform a certain action. For example, when deleting a file, a secondary dialog box typically asks the user to confirm or cancel the action. In the present embodiment, however, suspect commands that require secondary confirmation may be initiated by a user contacting the touch screen display with significantly greater force than required for non-suspect commands in order to avoid unintended activation and, if desired, to avoid the need for secondary dialog boxes.

As illustrated in FIG. 6, a contact with a selectable object on a touch screen display 102 is detected, where the selectable object is associated with a command to control the computing device 100 (252). The command to control the computing device 100 is determined to require secondary confirmation (254). A command may be determined to require secondary confirmation, e.g., if performing the command is likely an unintended action and/or may cause unusual, irreversible, non-default, or potentially system dangerous actions. Suspect commands that require secondary confirmation are application specific, but examples may include, e.g., deleting a file; exiting an application without saving; deleting a large number of files; moving, copying, or manipulating system files or large directories; opening a file in a non-default application; sending an electronic mail (email) that includes spelling errors or that has not undergone spelling or grammar correction; and sending an email with offensive content, profanity, or to multiple recipients, such as when one inadvertently replies to all. A force level of a contact with the touch screen display 102 is determined using at least one force sensor 106 coupled to a touch screen display 102 (256). The command may be initiated in response to the contact with the selectable object and the force level (260). For example, if desired, the force level may be compared to a threshold (258), where the command is initiated if the force level exceeds the threshold. For example, a first threshold may be used for selection of non-suspect commands, while a second force of greater magnitude may be required for selection of commands that require secondary confirmation.

Figure 7:
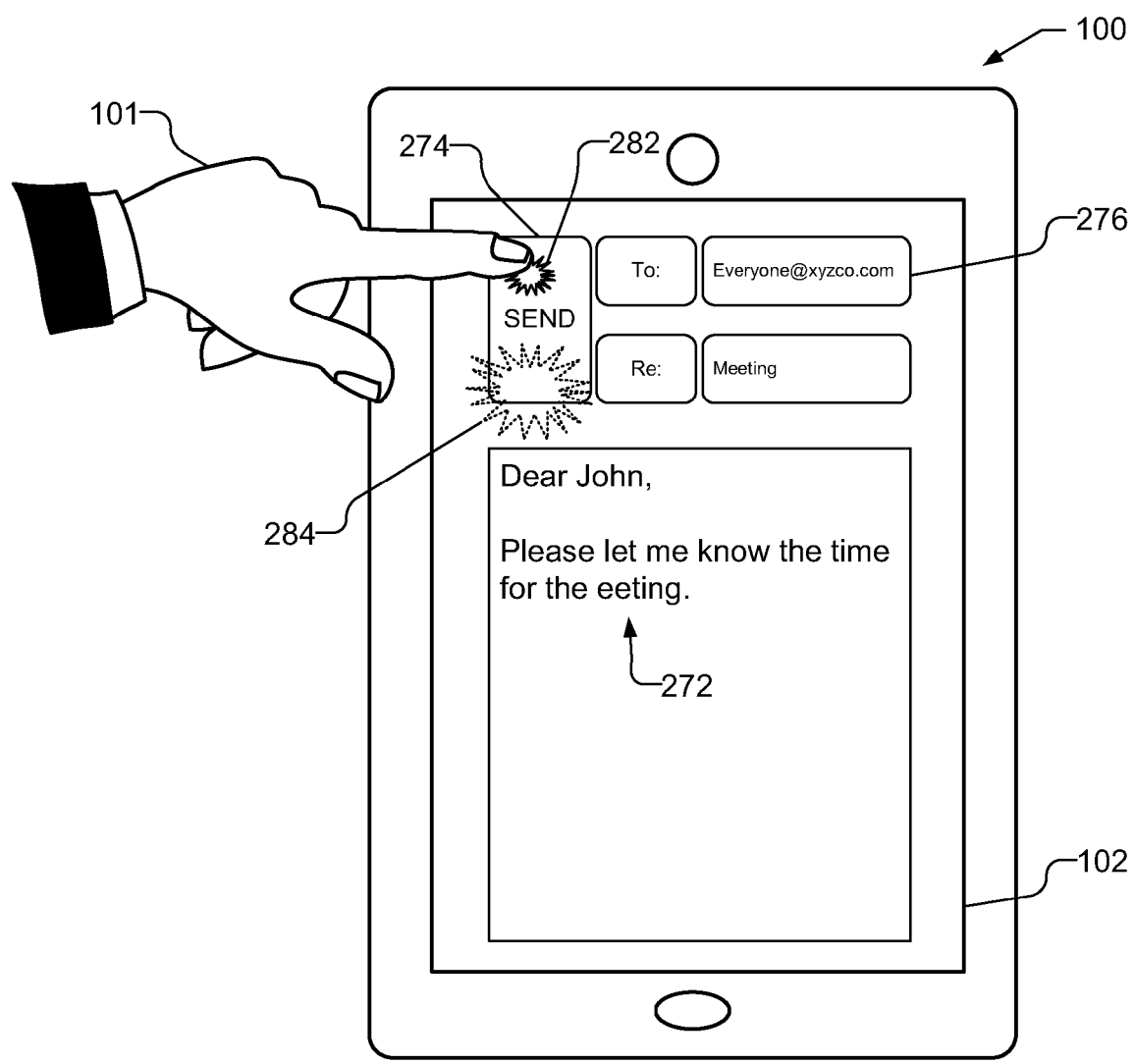
FIG. 7 illustrates, by way of example, a user contacting the touch screen display of computing device, which prevents an unintended activation of suspect command, which requires secondary confirmation, by requiring a contact with a higher force level.

FIG. 7 illustrates, by way of example, a user 101 contacting the touch screen display 102 of computing device 100, which prevents an unintended activation of suspect commands that require secondary confirmation by requiring a contact with a higher force level. In the present example, the computing device 100 is illustrated as displaying an email message, which includes a typographical error in the body 272 of the message. Additionally, the email message is addressed 276 to "everyone@xyzco.com", which may be a large number of people. Consequently, sending the email message may be determined to be a suspect action that requires secondary confirmation due to the typographical error in the body 272 of the message and the possible inclusion of a large number of people in the address. Thus, the user 101 may be required to contact the send virtual button 274 with a greater amount of force than if the action were not suspect. In other words, the user 101 contact with the send virtual button 274 illustrated by starburst 282 may be insufficient to initiate the send function, whereas a contact with greater force, illustrated as starburst 284, would be sufficient to initiate the send function. If desired, in one embodiment, the contact with lesser force, illustrated by starburst 282, may cause a secondary dialog box to appear to confirm or cancel the send function, while the contact with greater force, illustrated by starburst 284, may initiate the send function without the secondary dialog box. As discussed above, the increased force level requirement is not limited to email applications, but may be used with other types of applications and other types of suspect commands that require secondary confirmation.

Figure 8:
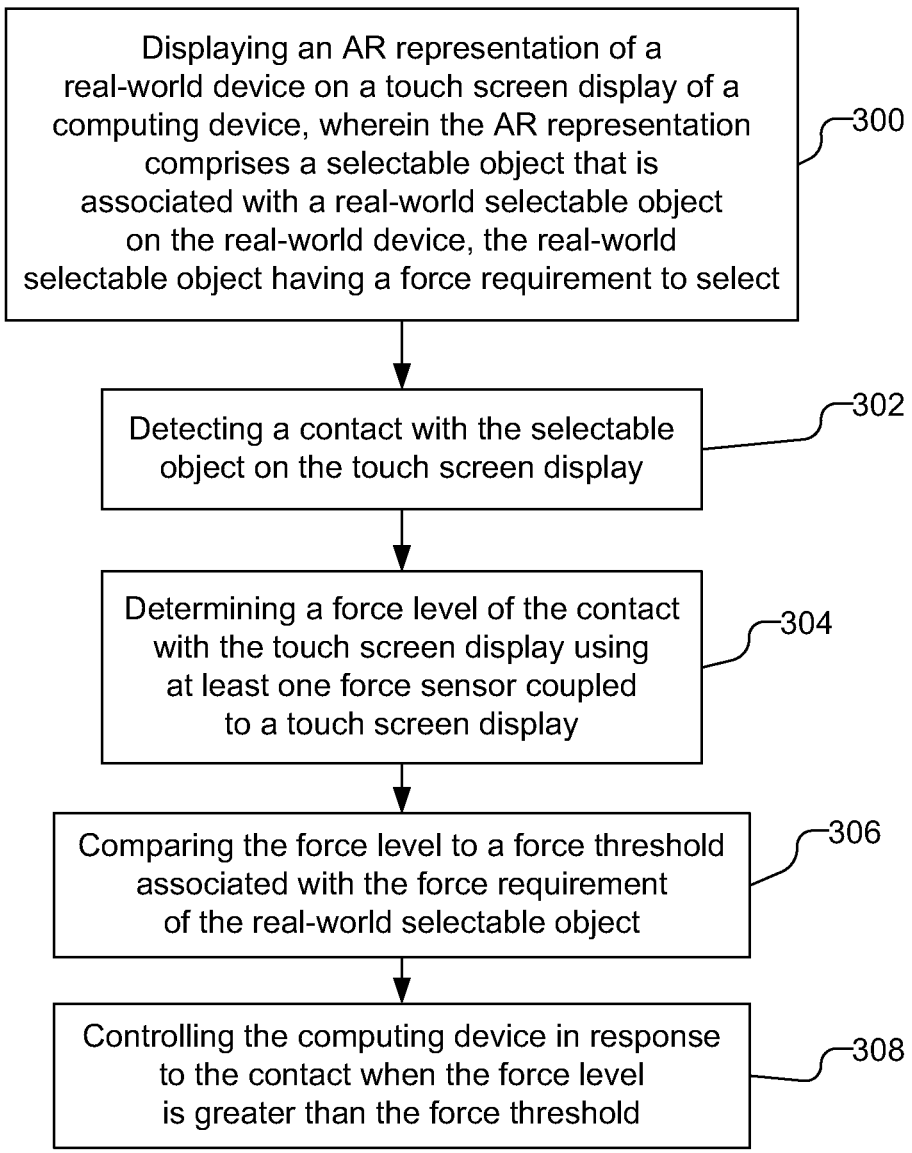
FIG. 8 is a flow chart illustrating one embodiment of using at least one force sensor on a touch screen display to control the operation of the computing device to mimic the force requirements of real-world objects in an augmented reality application.

FIG. 8 is a flow chart illustrating one embodiment of using at least one force sensor 106 on a touch screen display 102 to control the operation of the computing device 100 to mimic the force requirements of real-world objects in an augmented reality (AR) application. As illustrated in FIG. 8, an AR representation of a real-world device is displayed on a touch screen display 102 of a computing device 100 (300). The AR representation of the real-world device includes a selectable object that is associated with a real-world selectable object on the real-world device that has a force requirement to select. For example, the real-world selectable object may be a power button on a stereo that requires 5N of force to depress. A contact with the selectable object on the touch screen display is detected (302). A force level of the contact with the touch screen display 102 is determined using at least one force sensor 106 coupled to the touch screen display 102 (304). The force level is compared to a force threshold that is associated with the force requirement of the real-world selectable object (306). For example, the force threshold may be the same as the force requirement of the real-world selectable object. Alternatively, where the real-world object includes multiple selectable objects, e.g., a power button and a play button that have differing force requirements, the force threshold may be based on the ratio of the force requirements of the real-world selectable objects. The computing device 100 is controlled in response to the contact when the force level is greater than the force threshold (308), e.g., by initiating a command associated with the selectable object.

Figure 9:
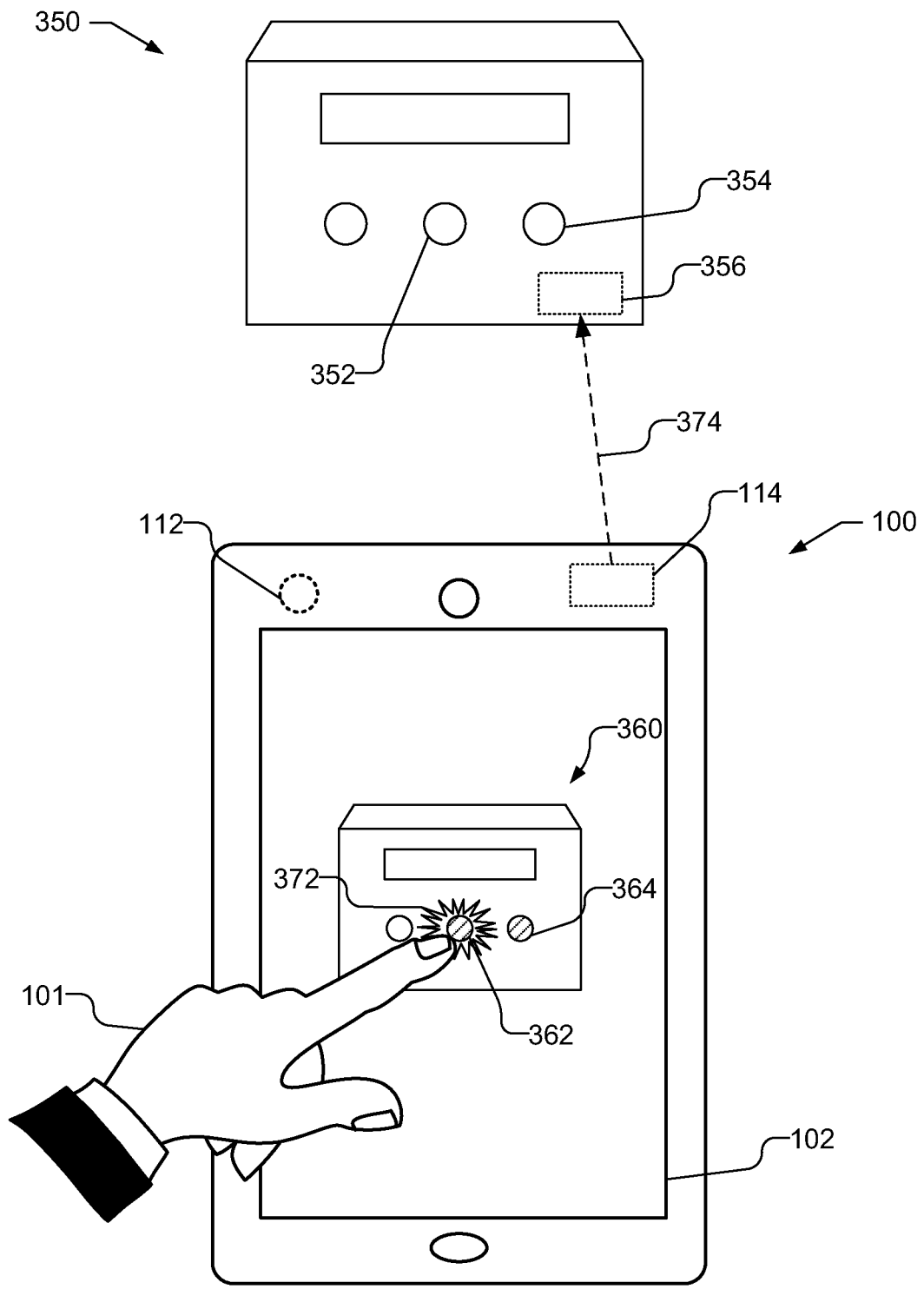
FIG. 9 illustrates, by way of example, a user contacting the touch screen display of computing device that includes an augmented reality application that mimics the force requirements of real-world objects.

FIG. 9 illustrates, by way of example, a user 101 contacting the touch screen display 102 of computing device 100 that includes an AR application that mimics the force requirements of real-world objects. FIG. 9 illustrates shows a real-world object in the form of a stereo 350 that includes a real-world selectable object in the form of a power button 352. The power button 352 has a force requirement for selection, e.g., a 5N force may be required to depress the power button 352. The stereo 350 may include other selectable objects, as illustrated by button 354, which may have differing force requirements. The computing device 100 displays on the touch screen display 102 an AR representation 360 of the stereo 350. The AR representation 360 is an image, or series of images, captured by camera 112, which includes a selectable object in the form of a virtual power button 362 and virtual button 364 that are associated with the power button 352 and button 354 on the stereo 350 and may also include augmented data, such as overlaid text or graphics (shown as shading on virtual power button 362 and button 364). Producing AR representations of real-world objects is well known in the art. The virtual power button 362 responds to a similar level of force as the real-world power button 352. In other words, when the user 101 contacts the virtual power button 362, illustrated by starburst 372, the force level of the contact, as detected by the force sensors 106 (shown in FIG. 2), is compared to a force threshold that is associated with the force requirement of the real-world power button 352. By way of example, the force threshold may be the same as the force requirement of the power button 352. Alternatively, the force threshold may be based on a ratio of force requirements of the real-world selectable objects on the stereo 350, e.g., the force thresholds associated with virtual power button 362 and virtual button 364 may have the same ratio as the force requirements of the power button 352 and the play button 354. When the force level of the contact 372 is greater than the force threshold, the selection of the virtual power button 362 may control the computing device 100, e.g. to launch a music application on the computing device 100. If desired, the computing device 100 may be in wireless communication with the stereo 350 as illustrated by the arrow 374 between a transceiver 114 on the computing device 100 and the receiver 356 on the stereo 350. Wireless communication may be accomplished through WiFi, Bluetooth, or any other desired wireless protocol. Selection of the virtual power button 362 may cause the computing device 100 to wirelessly communicate with the stereo 350 to control the stereo 350, e.g., to turn the stereo 350 on (or off). While FIG. 9 illustrates a specific implementation that includes a stereo, the present embodiment contemplates the use of force mimicry with any real-world object and augmented reality representation.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   detecting a contact with a selectable object on a touch screen display;
   determining a force level of the contact with the touch screen display using at least one force sensor coupled to the touch screen display; and
   initiating a first command that does not require secondary confirmation to control a computing device when the force level is greater than a first force level and initiating a second command that does require secondary confirmation to control the computing device when the force level is greater than a second force level that is greater than the first force level.

2. The method of claim 1, further comprising comparing the force level to a threshold, wherein the first command is initiated when the force level is greater than the threshold.

3. The method of claim 1, wherein a secondary dialog box is not displayed before initiating the second command when the force level is greater than the second force level.

4. The method of claim 1, wherein the second command that does require secondary confirmation may cause the computing device to perform an unusual, non-default, irreversible or potentially system dangerous action.

5. The method of claim 1, wherein the second command that does require secondary confirmation is at least one of a non-default option, command to manipulate system files or directories, open content in non-default application, or sending email with spelling errors, grammatical errors, offensive content, or multiple recipients.

6. An apparatus comprising:
   a housing;
   a touch screen display comprising a display, a touch sensor coupled to the display, and at least one force sensor coupled between the housing and the display; and
   a processor connected to receive data from the touch sensor and the at least one force sensor, wherein the processor is configured to detect a contact with a selectable object on the touch screen display based on the data from the touch sensor, determine a force level of the contact with the touch screen display based on data from the at least one force sensor, and initiate a first command that does not require secondary confirmation to control a computing device when the force level is greater than a first force level and initiate a second command that does require secondary confirmation to control the computing device when the force level is greater than a second force level that is greater than the first force level.

7. The apparatus of claim 6, wherein the processor is further configured to compare the force level to a threshold, wherein the first command is initiated when the force level is greater than the threshold.

8. The apparatus of claim 6, wherein the processor is further configured to cause the display to not display a secondary dialog box before initiating the second command when the force level is greater than the second force level.

9. The apparatus of claim 6, wherein the second command that does require secondary confirmation may cause the processor to perform an unusual, irreversible, non-default, or potentially system dangerous action.

10. The apparatus of claim 6, wherein the second command that does require secondary confirmation is at least one of a non-default option, command to manipulate system files or directories, open content in non-default application, or sending email with spelling errors, grammatical errors, offensive content, or multiple recipients.

11. An apparatus comprising:
    means for detecting a contact with a selectable object on a touch screen display
    means for determining a force level of the contact with the touch screen display using at least one force sensor coupled to the touch screen display; and
    means for initiating a first command that does not require secondary confirmation to control a computing device when the force level is greater than a first force level and initiating a second command that does require secondary confirmation to control the computing device when the force level is greater than a second force level that is greater than the first force level.

12. The apparatus of claim 11, further comprising means for comparing the force level to a threshold, wherein the first command is initiated when the force level is greater than the threshold.

13. A non-transitory computer-readable medium including program code stored thereon, comprising:
    program code to detect a contact with a selectable object on a touch screen display;
    program code to determine a force level of the contact with the touch screen display using at least one force sensor coupled to the touch screen display; and
    program code to initiate a first command that does not require secondary confirmation to control a computing device when the force level is greater than a first force level and initiate a second command that does require secondary confirmation to control the computing device when the force level is greater than a second force level that is greater than the first force level.

14. The non-transitory computer-readable medium of claim 13, further comprising program code to compare the force level to a threshold, wherein the first command is initiated when the force level is greater than the threshold.

* * * * *